US011689811B2

(12) United States Patent
Mojaver

(10) Patent No.: US 11,689,811 B2
(45) Date of Patent: *Jun. 27, 2023

(54) METHOD AND APPARATUS FOR OBTAINING ENHANCED RESOLUTION IMAGES

(71) Applicant: Epilog Imaging Systems, Inc., San Jose, CA (US)

(72) Inventor: Michael Mojaver, Poway, CA (US)

(73) Assignee: Epilog Imaging Systems, Inc., San Jose, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/176,783

(22) Filed: Feb. 16, 2021

(65) Prior Publication Data

US 2021/0168286 A1 Jun. 3, 2021

Related U.S. Application Data

(63) Continuation of application No. 15/669,737, filed on Aug. 4, 2017, now Pat. No. 10,924,668, which is a
(Continued)

(51) Int. Cl.
*H04N 5/232* (2006.01)
*H04N 23/698* (2023.01)
(Continued)

(52) U.S. Cl.
CPC .......... *H04N 23/698* (2023.01); *G06T 7/207* (2017.01); *G06T 7/215* (2017.01); *H04N 23/45* (2023.01);
(Continued)

(58) Field of Classification Search
CPC ......... G06T 7/207; G06T 7/215; G16H 30/40; H04L 63/0492; H04L 63/18;
(Continued)

(56) References Cited

U.S. PATENT DOCUMENTS 5,923,466 A 7/1999 Krause et al.
H1914 H 11/2000 Watkins
(Continued)

FOREIGN PATENT DOCUMENTS

EP 3494692 A1 6/2019
WO 2016015623 A1 2/2016
WO 2018027182 A1 2/2018

OTHER PUBLICATIONS

International Preliminary Report on Patentability, PCT/US2017/045598, dated Feb. 14, 2019, 9 Pages.
(Continued)

*Primary Examiner* — Md N Haque
(74) *Attorney, Agent, or Firm* — Potomac Law Group, PLLC; Reza Mollaaghababa; Reza Sadr

(57) ABSTRACT

An imaging system for obtaining images having enhanced features is described. The imaging system includes an optical system that receives and direct light from a field of view to two or more image planes. The image planes are optically coupled and configured to detect at least a portion of the received light and generate image data corresponding to the field of view. The system can include a processor that receives the image data generated by each plane and combines the data to form a combined image. The combined image can have a higher resolution than any image that can be obtained from the individual image sensors and the image plane may be curved to reduce the cost of optics. The processor can detect objects (e.g., moving objects) contained in images obtained from one image plane and configure the other image planes to obtain more detailed images of the detected objects.

12 Claims, 10 Drawing Sheets

Related U.S. Application Data continuation-in-part of application No. 14/847,886, filed on Sep. 8, 2015, now Pat. No. 10,348,963, which is a continuation of application No. 13/236,057, filed on Sep. 19, 2011, now Pat. No. 9,137,433.

(60) Provisional application No. 62/370,875, filed on Aug. 4, 2016.

(51) Int. Cl.
| | | |
|---|---|---|
| *G06T 7/207* | (2017.01) | |
| *G06T 7/215* | (2017.01) | |
| *H04N 23/45* | (2023.01) | |
| *H04N 23/54* | (2023.01) | |
| *H04N 23/55* | (2023.01) | |
| *H04N 23/60* | (2023.01) | |
| *H04N 23/80* | (2023.01) | |

(52) U.S. Cl.
CPC ............. *H04N 23/54* (2023.01); *H04N 23/55* (2023.01); *H04N 23/60* (2023.01); *H04N 23/80* (2023.01)

(58) Field of Classification Search
CPC .. H04N 5/2253; H04N 5/2254; H04N 5/2258; H04N 5/232; H04N 5/23229; H04N 5/23238
See application file for complete search history.

(56) References Cited

U.S. PATENT DOCUMENTS

| | | | |
|---|---|---|---|
| 7,294,815 | B2 | 11/2007 | Haven |
| 7,339,741 | B1* | 3/2008 | Wang .................... G02B 13/146 250/339.01 |
| 7,478,754 | B2 | 1/2009 | Gurevich et al. |
| 8,305,448 | B2 | 11/2012 | Yoda |
| 2004/0201704 | A1 | 10/2004 | Tseng et al. |
| 2004/0223199 | A1 | 11/2004 | Olszak |
| 2005/0018279 | A1 | 1/2005 | Johnson |
| 2005/0046944 | A1 | 3/2005 | Shenderova et al. |
| 2005/0190310 | A1* | 9/2005 | Koyama ............... G01R 31/311 349/5 |
| 2005/0220353 | A1 | 10/2005 | Karczewicz et al. |
| 2006/0261167 | A1 | 11/2006 | Ray et al. |
| 2007/0084927 | A1 | 4/2007 | Itou et al. |
| 2007/0166045 | A1 | 7/2007 | Wang |
| 2008/0180678 | A1* | 7/2008 | Gordley ............. G01N 21/3504 356/437 |
| 2009/0140143 | A1* | 6/2009 | Fukuda ................. H01J 37/026 250/311 |
| 2009/0180020 | A1 | 7/2009 | Nayar et al. |
| 2010/0026785 | A1* | 2/2010 | Soto-Thompson ......................... A61B 1/00186 348/47 |
| 2010/0102239 | A1 | 4/2010 | Hahn et al. |
| 2010/0103300 | A1 | 4/2010 | Jones et al. |
| 2010/0214468 | A1 | 8/2010 | Caron |
| 2010/0283842 | A1 | 11/2010 | Guissin et al. |
| 2011/0032325 | A1 | 2/2011 | Harris |
| 2011/0109736 | A1 | 5/2011 | Mertz et al. |
| 2013/0070091 | A1 | 3/2013 | Mojaver |
| 2013/0070103 | A1 | 3/2013 | Mojaver |
| 2014/0354854 | A1* | 12/2014 | Venkataraman ....... G02B 5/201 348/239 |
| 2015/0103166 | A1 | 4/2015 | Mojaver |
| 2015/0373263 | A1* | 12/2015 | Georgiev ............. H04N 5/2252 348/218.1 |
| 2016/0028952 | A1 | 1/2016 | Mojaver |

OTHER PUBLICATIONS

International Search Report and Written Opinion received in PCT/US2017/045598 dated Oct. 9, 2017, 12 pages.

Suntharalingam, Vyshnavi et al "A 4-Side Tileable Back Illuminated 3D-Integrated Mpixel CMOS Image Sensor", IEEE (2009) pp. 1-3.

European Examination Report, 17757950.5, dated Oct. 7, 2021, 6 pages.

* cited by examiner

METHOD AND APPARATUS FOR OBTAINING ENHANCED RESOLUTION IMAGES

RELATED APPLICATIONS

This application is a Continuation of application Ser. No. 15/669,737 filed on Aug. 4, 2017. Application Ser. No. 15/669,737 claims the benefit of U.S. Provisional Application 62/370,875 filed on Aug. 4, 2016. Application Ser. No. 15/669,737 is a Continuation-in-part of application Ser. No. 14/847,886 filed on Sep. 8, 2015. Application Ser. No. 14/847,886 is a Continuation of application Ser. No. 13/236,057 filed on Sep. 19, 2011. The entire contents of these applications are incorporated herein by reference in their entirety.

TECHNICAL FIELD

The present disclosure relates generally to imaging and tracking systems and methods, and more particularly to imaging systems and methods that allow for imaging of a field of view using more than one image plane, where the image planes work in a cooperative (e.g., complementary) manner to generate an image of the field of view, e.g., an image with enhanced details.

BACKGROUND

Imaging systems can be employed in a variety of applications. For example, in surveillance applications, autonomous driving and virtual reality imaging systems can provide still or video images of a field of view. Further, in some cases, imaging systems can detect changes in the field of view at a distance, such as movement of a vehicle, a person, presence of a traffic sign, or changes in a traffic light. Some imaging systems can provide depth information regarding a field of view for all or a portion of that field of view. For example, some imaging systems can use a pair of cameras, placed at a fixed known distance apart from one another, to extract and obtain depth information using, for example, binocular disparity by detecting the difference in coordinates of similar features within two stereo images.

However, there is still a need for improved imaging systems. For example, in surveillance and autonomous driving applications, it is desirable to obtain images of a tracked object at a much higher resolution than that provided by conventional imaging systems. One approach for enhancing resolution in an imaging system, which can be very costly, is to increase the image sensor size. Generally, the main economical alternative to increasing sensor size has been reducing pixel dimensions, i.e., putting more, smaller pixels on the same size sensor. This approach can, however, adversely affect the signal-to-noise ratio (e.g., result in grainy images in low light) or reduce depth of field (e.g., images can be in focus in a very narrow range instead of the entire image). Cameras with large sensors and resolution in excess of 100 megapixels, therefore, remain prohibitively costly, rendering them undesirable for use in surveillance, autonomous driving, and professional photography applications.

SUMMARY

In one aspect an imaging system is disclosed, which includes an optical system configured to receive light from a field of view and direct the received light to a plurality of image planes. The imaging system can also include a first plurality of image detectors optically coupled to a first image plane. The first plurality of image detectors can be configured to detect at least a portion of the light directed by the optical system to the first image plane and generate first image data corresponding to at least a portion of the field of view. The imaging system can also include a second plurality of image detectors optically coupled to at least another image plane. The second plurality of image detectors can be configured to detect at least a portion of the light directed by the optical system to the at least another image plane and generate second image data corresponding to complementary portions of the field of view.

In another aspect, an imaging method for obtaining enhanced images is disclosed, which comprises receiving light from a field of view and directing the received light to a plurality of image planes. At least a portion of the light directed to a first image plane is detected, at the first image plane, using a first plurality of detectors optically coupled to the first image plane, and used to generate first image data corresponding to at least a portion of the field of view. At least a portion of the light directed to at least another image plane is detected, using a second plurality of image detectors optically coupled to the least another image plane, to generate second image data corresponding to other (e.g., complementary) portions of the field of view. The second image data can include data unique to the at least another image plane and/or data overlapping with at least a portion of the first image data. A processor coupled to the plurality of image planes receives the first and second image data and generates a first image of the field of view, corresponding to the first image data, and a second image of the field of view, corresponding to the second image data. The first and second image data can be combined to generate combined image data of the field of view and an enhanced image of the field of view can be generated using the combined image data.

In other examples, any of the aspects above, or any system, method, apparatus described herein can include one or more of the following features.

The optical system can be configured to split the light received from the field of view into two or more portions and direct said portions to different image planes. By way of example, the optical system can include an image splitter (e.g., image splitter system) configured to split the light received from the field of view. The image splitter can be at least one of a prism-type image splitter, a flat Pellicle-type image splitter, or a curved Pellicle-type image splitter.

The optical system can further include a processor. The processor can be in communication with the first and second plurality of image detectors and configured to receive the first and second image data and generate a first image of the field of view, corresponding to the first image data, and a second image of the field of view, corresponding to the second image data.

The second image data can include data unique to the at least another image plane and/or data overlapping with at least a portion of the first image data. The processor can be configured to combine the first and second image data to generate combined image data of the field of view, and generate an image of the field of view using the combined image data. The processor can further be configured to combine the first and second images of the field of view to generate a combined image of the field of view having at least one of 1) higher resolution or 2) additional depth information than that of the first image or the second image. The first plurality of image detectors can further be configured to obtain a video image of the field of view, and the processor can be configured to analyze the obtained video image to identify one or more moving objects within the field of view. The processor can further be configured to control the second plurality of image detectors to acquire image data of at least a portion of the field of view having at least one of the identified one or more moving objects included therein. Additionally or alternatively, the processor can receive image data of at least one moving object from the second plurality of image detectors and generate a video image of the at least one moving object at a higher image resolution than an image resolution of the first image.

Further, the processor can combine the first and the second image data to form an image of the field of view. Specifically, the processor can combine the image data to form the final image and need not to first generate a first image based on the first image data and a second image based on the second image data in order to form an image of the field of view.

The imaging system can include at least one display element. The display element can be in communication with the processor and configured to display at least one of the first or second image and/or an image formed by combining the first and the second images. Additionally, or alternatively, the imaging system can include a user interface. The user interface can be in communication with the processor and configured to receive input instructions from a user of the imaging system. For example, the user interface can be configured to receive instructions requesting additional information regarding a specific portion of the first image. The processor can, in response to the instructions, control the second plurality of image detectors to acquire image data of at least a portion of the field of view corresponding to the specific portion of the image. Additionally, or alternatively, the processor can generate a plurality of second images corresponding to one or more portions of the first image according to a predefined pattern.

Further, at least one of the first plurality of image detectors and the second plurality of image detectors can comprise at least one of a substantially flat geometry or a substantially curved geometry. In some embodiments, at least one of the image planes can include a plurality of detecting elements that are positioned at an angle relative to one another. In such embodiments, vectors orthogonal to the surface of any two adjacent detecting elements associated with an image plane can form an acute angle, e.g., an angle image in a range of about 0.01 degrees to about 10 degrees relative to one another. Further, in some embodiments at least two image planes from the plurality of image planes can be positioned at an angle relative to one another. Additionally, or alternatively, the optical system can include a wide-angle lens, the wide-angle lens being configured to direct the light received from a wide field-of-view to the plurality of image planes. For example, the optical system can include a wide-angle lens that can form a curved focal plane. By way of example, the wide-angle lens can comprise a fisheye lens.

The optical system can include any suitable optical element known in the art. For example, the optical system can include at least one lens and at least one beam splitter coupled to the at least one optical lens. The beam splitter can be configured to divert at least one portion of the light to the first image and divert at least another portion of the light to the at least another image plane. Additionally, in some embodiments, the optical system can include plurality of optical paths, for example four optical paths in a x-cube type prism Each optical path can have an independent or separate optical axis.

Furthermore, in some embodiments, the imaging system can include an image capture device that includes at least one wide-angle lens. The wide-angle lens can be configured to collect light received from a wide-angle field of view.

Other aspects and advantages of the invention can become apparent from the following drawings and description, all of which illustrate the principles of the invention, by way of example only.

BRIEF DESCRIPTION OF THE DRAWINGS

Features and advantages of the invention described herein, together with further advantages, may be better understood by referring to the following description taken in conjunction with the accompanying drawings. The drawings are not necessarily to scale, emphasis instead is generally placed upon illustrating the principles of the invention.

DETAILED DESCRIPTION

Figure 1A:
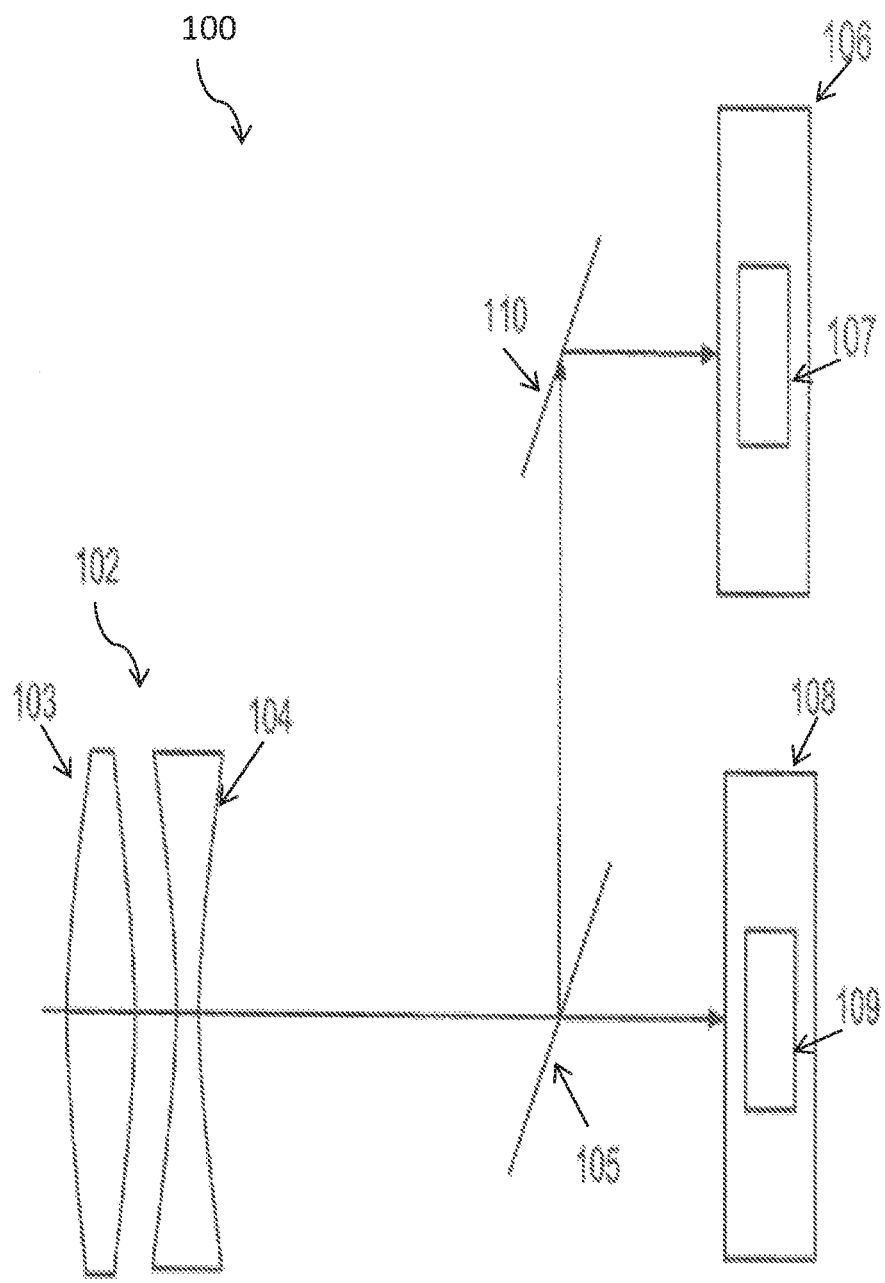
FIG. 1A is a schematic illustration of an example of an optical system according to some embodiments disclosed herein.

The present disclosure relates to systems and methods for obtaining still or video images of a field of view and displaying high resolution images of at least a portion of the field of view, while presenting information regarding the context of that portion within the field of view. Embodiments described herein can provide for simultaneous and rapid generation of high resolution images corresponding to different portions of the field of view. Such rapid generation of the high resolution images can be suitable for a variety of applications, and in particular, for object tracking applications in which high resolution images of one or more objects are generated, as those object(s) move within the field of view. Further, in some embodiments, a system according to the present teachings can operate by directing light from a field of view onto two or more image planes that are optically coupled to one or more image detectors. In some embodiments, the two or more image planes can work in a complimentary manner to extract 3D information within overlapping regions of the field of view. Such imaging systems can be used in a wide range of applications, for example in autonomous driving and in virtual reality applications.

In some embodiments, optical systems are disclosed that employ a plurality of image planes to acquire image data from multiple portions of a field of view and combine such image data (e.g., digitally stich the image data associated with different image planes) to obtain a composite image of the field of view. The composite image can exhibit a resolution greater than the resolution of images that can be formed from the image data acquired at the individual image planes.

The term "resolution" is used herein consistent with its common usage in the art, and particularly in the field of digital imaging, to refer to the number of light sensitive pixels per unit length or per unit area in an image. For example, a 35 mm film used in professional photography has an effective resolution of approximately 20 megapixels per frame when coupled with high quality diffraction limited optics.

The term "image plane" is also used herein consistent with its known meaning in the art. To the extent that any further explanation may be needed, the term "image plane" can refer to a plane on which the image of at least a portion of the field of view is formed, e.g., the surface of a detector. The image plane can be flat, curved, or have any other suitable shape known in the art. Further, sensors or image detecting elements described herein can be placed in image planes in any suitable manner. For example, different sensors can each have a separate image plane. Further, each image plane can be a part or a region of a larger image plane. For example, in embodiments in which the sensors are configured to detect a portion of the image from optics having a common optical axis (e.g., a lens and one or more sensors and/or beam splitters to allow multiple sensors to detect offset/overlapping regions of the image), image planes can be described as regions of a larger image plane.

FIG. 1A is a schematic illustration of an example of an optical system 100 according to some embodiments disclosed herein. The imaging system 100 can include an optical system 102 having one or more optical elements for collecting light from a field of view (not shown). For example, in the implementation illustrated in FIG. 1A, the optical system 102 can include a converging lens 103 and a diverging lens 104. The converging lens 103 and the diverging lens 104 can, in combination, direct the collected light onto a beam splitter 105. For example, the converging lens 103 and the diverging lens 104 can collectively collimate the light received from the field of view and direct the collimated light to the beam splitter 105. In some embodiments, the optical system 102 can include an image capture device including at least one wide-angle lens that collects light received from a wide-angle field of view.

A portion of the light incident on the beam splitter 105 can be reflected by the beam splitter 105 to a first image plane 106. Another portion of the incident light can be passed through the beam splitter 105 to a second image plane 108. Generally, the beam splitter 105 can direct the one or more portions of the light incident thereon using any scheme known in the art. For example, in the implementation shown in FIG. 1A, a mirror 110 can be used to receive the portion of the light forwarded by the beam splitter 105 and direct the received light (e.g., by reflection) onto the first image plane 106.

An image detector 107 can be optically coupled to the first image plane 106 and configured to detect at least a portion of the light that is directed to the first image plane in order to acquire first image data of the field of view or at least a portion of the field of view.

A second image detector 109 can also be optically coupled to the second image plane 108. Similarly, the second image detector 109 can be configured to acquire second image data of the field of view or at least a portion thereof. As discussed in more detail below, in some embodiments, the second image data can be combined with the first image data to construct a higher resolution image than an image constructed based on the first image data acquired by the first image detector 107 or second image detector 109 individually.

Although not illustrated in FIG. 1A, an optical system 100 according to embodiments disclosed herein can include additional image planes and/or detectors. For example, the optical system 100 can include a third image plane and/or a third image detector, to which light emanating from the field of view can be directed. Further, additional beam splitters or other optical components can be used to direct one or more portions of the light within the optical system 100. Such configurations can allow for multiple higher resolution images to be created simultaneously from different portions of the field of view. For example, two image planes (e.g., each receiving an output of a beam splitter), can each have a horizontal array of sensors offset from the other plane to allow for multiple overlapping regions in the horizontal direction removing any dead zones. In other non-limiting examples, three image planes, each having a two-dimensional array of sensors offset from the other planes, can be used. Such image planes can allow for multiple overlapping regions in the horizontal and vertical directions removing any dead zones. Image sensors generally have dead zones surrounding active sensing pixels in the form of calibration pixels, readout electronics or packaging. The dead zones preclude contiguous horizontal or vertical tiling of multiple image sensors.

Figure 1B:
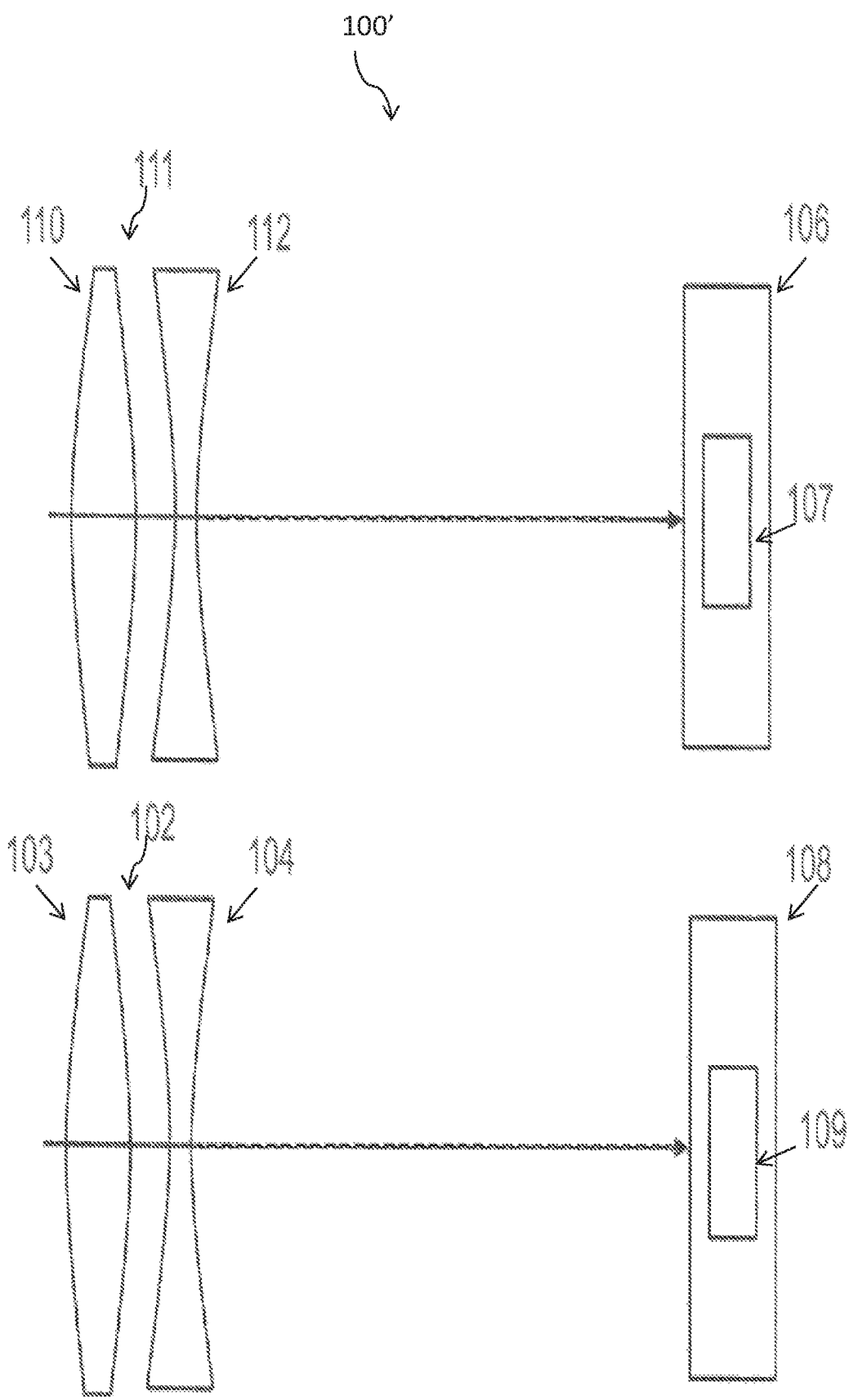
FIG. 1B is a schematic illustration of another example of an optical system according to some embodiments disclosed herein.

FIG. 1B is a schematic illustration of another example of an optical system 100' according to some embodiments disclosed herein. As shown in FIG. 1B, the imaging system 100' can include two or more optical systems 102, 111 for collecting light from two or more corresponding fields of view (not shown).

Each optical system 102, 111 can include any suitable optical component or system available in the art. Further, the optical system can comprise a plurality of optical paths, each having an independent optical axis. For example, as shown in FIG. 1B, each optical system 102, 111 can include a converging lens 103, 110 and a diverging lens 104, 112. Further, each optical system 102, 111 can direct the collected light onto one or more corresponding image planes 106, 108. Each image plane 106, 108 can include one or more image detectors 107, 109. Each image detector 107, 109 can be configured to detect at least a portion of the light that is directed to that image plane in order to generate image data of its corresponding field of view or at least a portion of the corresponding field of view.

Specifically, the first image plane 108 can be configured to receive at least a portion of the light that is directed from a first portion of the field of view (not shown) to the first optical system 102. Similarly, the second image plane 106 can be configured to receive at least a portion of the light directed from a second portion of the field of view (not shown) to the second optical system 111. The first detector 109 can be configured to detect at least a portion of the light that is directed to the first image plane in order to generate first image data of the first portion of the field of view. Similarly, the second detector 107 can be configured to detect at least a portion of the light that is directed to the second image plane in order to generate second image data of the second portion of the field of view.

The first and second portions of the field of view can be complementary and/or overlapping regions. For example, the first and second portions can each represent a subset of the field of view. These subsets of the field of view can be selected such that once combined they can span and represent the entire of field of view. Alternatively or additionally, the first and second portions of the field of view can be overlapping regions. For example, the first portion of the field of view can represent the entire field of view and the second portion of the field of view can represent a subset/segment of the field of view that overlaps with the first portion. In another example, the first and second portions can be complementary regions (each can be a subset of the field of view) which can also include at least some overlapping regions)

Similarly, the first and second image planes can be complementary fields of view. For example, the first field of view can include a portion of the second field of view or be a subset of the second field of view. Additionally or alternatively, the first and second fields of view can be or include one or more portions of a larger field of view. For example, the first and second fields of view can be complementary fields of view that together represent one or more portions of a larger field of view. Accordingly, the first image data and the second image data can be combined to create an image of the field of view represented by the first and second fields of view.

Figure 2:
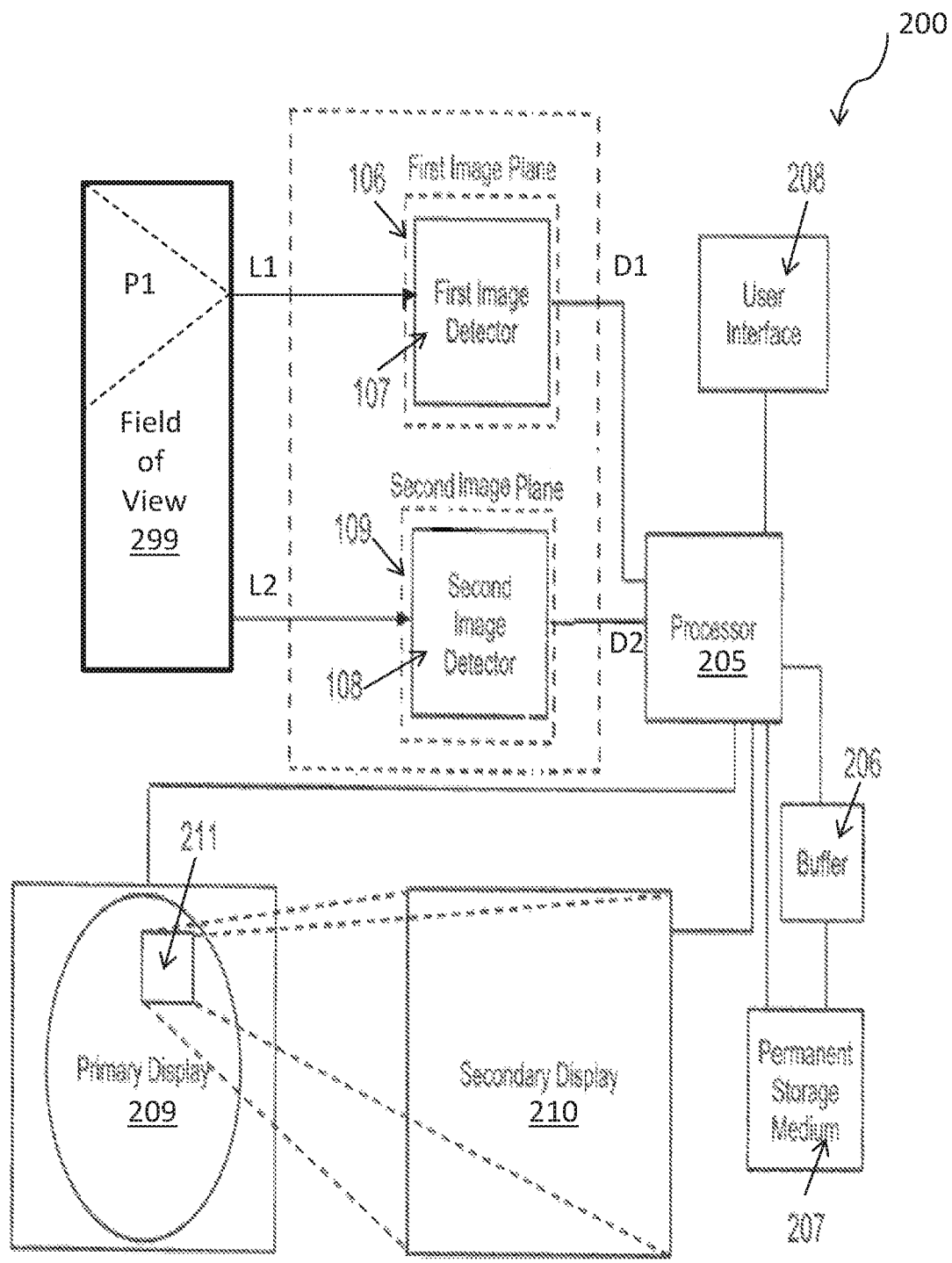
FIG. 2 is a block diagram of an imaging system according to some embodiments disclosed herein.

FIG. 2 is an example of an imaging system 200 according to some embodiments disclosed herein. As shown in FIG. 2, the imaging system 200 can include a processor 205. The processor 205 can be any processor or processing system known in the art. For example, the processor 205 can be a data processing apparatus, e.g., a programmable processor, a computer, or multiple computers.

The processor 205 can be electrically coupled to one or more image detectors. For example, as shown in FIG. 2, the processor 205 can be coupled to a first image detector 107 and a second image detector 109. Each of the detectors 107, 109 can be disposed in one or more corresponding image planes. For example, as shown in FIG. 2, the first image detector 107 can be disposed in a first image plane 106 and the second image detector 108 can be disposed in a second image plane 109.

As noted above and described in further details below, the processor 205 can be configured to collect image data acquired by the image detectors, combine the collected data, and use the combined data to generate an image of a field of view 299. Specifically, as shown in FIG. 2, the first image detector 107 can be disposed in a first image plane 106 and configured to detect at least a portion of the light (L1) directed from at least a first portion of the field of view and generate first image data (D1) corresponding to the detected portion of the light. Similarly, the second detector 108 can be disposed in a second image plane 109 and configured to detect at least a portion of the light directed (L2) from at least a second portion of the field of view and generate second image data (D2) corresponding to the detected portion of the light. As noted above, the first and second image data can correspond to complementary and/or overlapping regions.

The processor 205 can receive the data D1, D2 from the first 107 and the second 108 image detectors and process and combine the collected image data to construct a resulting combined image. Further, as discussed in more detail below, the processor 205 can form an image of a field of view 299 based on the image data acquired by the first 107 and second 108 image detectors and analyze that image to identify one or more objects of interest, if any, in the field of view 299.

Additionally, the processor 205 can be configured to select a portion of the field of view 299 for which image data is collected by one or more detectors and utilize other detectors to collect additional image data corresponding to the selected portion of the field of view. The processor 205 can use the additional image data to generate enhanced images of the field of view and/or enhanced images of the selected portion of the field of view. For example, the processor 205 can select a portion (P1) of the field of view 299, for which image data D1 is acquired by the first image detector 107. The processor can also collect second image data D2, corresponding to the selected portion (P1) of the field of view 299, using the second detector 108. The first image data D1 and the second image data D2 can be used to generate an enhanced image of the field of view and the selected portion (P1) of the field of view. For example, the first and second image data D1, D2 can be used to generate an image having a higher resolution than an image constructed solely based on the first (D1) or the second (D2) image data. Further, in addition to processing image data obtained from overlapping regions, the processor 205 can process image data from complementary regions of the field of view 299 to obtain enhanced images of the field of view 299.

As disclosed in further details below, in some embodiments, the processor can detect one or more objects of interest in the first image and configure the second detector 108 to obtain image data corresponding to a portion of the field of view in which the one or more objects of interest are detected. This allows for obtaining enhanced images of the portions of field of view containing the detected objects of interest (e.g., images having higher resolution). It should be noted that the images obtained by the first and second image detectors 107, 108 are not limited to static images. The first and/or second image detectors can detect and generate data suitable for forming dynamic (e.g., video) images. Further, the processor can be configured to analyze dynamic images (video) obtained by the first detector to detect one or more objects of interest and control the second detector to obtain more detailed images (static or dynamic) of the portion of field of view containing the detected objects of interest.

Further, as shown in FIG. 1B, additional information regarding the field of view can be obtained by utilizing independent optical paths and/or independent optical lenses. For example, in certain embodiments, image data obtained (by utilizing independent optical paths and/or independent optical lenses) from overlapping regions of a field of view can be used to extract depth information. Depth information can be very valuable in video surveillance, autonomous driving Virtual Reality and many other applications.

The optical system 200 can also include a buffer 206, which can be used to store (e.g., temporarily store) image data acquired by the first 107 and the second 108 image detectors. The buffer 206 can be connected to the processor 205 and configured such that the processor 205 can communicate with the buffer 206 to store image data in the buffer 205 and/or retrieve image data from the buffer 205. The buffer 206 can be any buffer and/or storage medium known in the art. Further, the buffer 206 can be an integral portion of the optical system 200 and/or any component included in the optical system 200. Alternatively or additionally, the buffer 206 can be an independent component coupled to the optical system 200. For example, in some embodiments, each of the first 107 or second 108 image detectors can include an integrated buffer for temporary storage of the image data acquired by that image detector 107, 108.

The processor 205 can also be coupled to one or more interfaces. For example, as shown in FIG. 2, the processor 205 can be coupled to one or more display elements 209, 210 and/or a user interface 208. In the example shown in FIG. 2, the processor 205 is coupled to a primary display 209 and a secondary display 210. The primary 209 and secondary 210 displays can receive data (e.g., data corresponding to the first and second image data, D1 and D2) from the processor 205, and display images corresponding to the received data.

In some embodiments, the processor 205 can cause the display of a graphical element 211, such as a call-out box, in a display element (e.g., the primary display 209). The graphical element 211 can highlight the portion of the first image that has been re-produced as the second image at a higher resolution, and display the higher resolution image (e.g., in the secondary display 210). The term "display," as used herein, can refer to a device, such as a computer monitor or a television monitor, that allows visual presentation of data, e.g., images, and it can also refer to at least a portion of a screen provided by such a device for viewing images. For example, each of the primary and secondary display 209, 210 can refer to a computer monitor or a window provided on a computer screen.

Further, as noted above, the optical system 200 can include a user interface 208 connected to the processor 205. The user interface 208 can allow a user (not shown) to interact with the optical system 200 and/or control the functions and/or components of the optical system 200. The user interface module 208 can include any suitable interface hardware known in the art. For example, the user interface module 208 can be a mouse, keyboard, stylus, trackpad, or other input devices. In some embodiments, these input devices can be used in combination with the primary and secondary displays 209, 210 to allow a user to select a portions of the field of view that is displayed.

The optical system 200 can further include other or additional storage elements, for example a permanent storage medium 207. The permanent storage medium 207 can store information, such as the first and second image data D1, D2 and/or the resulting images for later access and/or review. The processor 205 can be in communication with the permanent storage medium 207 and arranged to cause the transfer and/or retrieval of the image data and/or images constructed from the image data to/from the permanent storage medium 207. The information (e.g., data or images) stored in the permanent storage medium 207 can be used in processing and/or display of data and images. Further, in some embodiments, one or more elements that can display and save the image for later retrieval and display can be utilized. For example, in some implementations, a hybrid system that can both display and save image data for later retrieval and review can be utilized.

Further, in some embodiments, the first image detector 107 can acquire the image data D1 by detecting light collected from the field of view 299 using an optical system, such as optical system 102 shown in FIGS. 1A-1B. The optical system 102 can include any suitable optical element available in the art. For example, the optical system 102 can include a wide-angle lens (e.g., lens 103, shown in FIGS. 1A-1B, can be a wide-angle lens) that can capture the light directed from a scene within at least one portion of the field of view 299.

The wide-angle lens can be any suitable wide-angle lens known in the art. For example, the wide-angle lens can be a fisheye lens that can capture light received from a 180-degree field of view (e.g., a wide-angle field of view) and direct that light to the first image detector 107. The first image detector 107 (which, as described below with reference to FIGS. 3A-3C, can typically include a plurality of image detecting elements) can convert the optical photons incident thereon into electrical signals. The first image detector 107 can use any suitable technique known in the art for converting the incident light into corresponding electrical signals. These electrical signals can be stored (e.g., under the control of the processor 205) in a storage medium, such as buffer 206. The processor 205 can retrieve the stored image data (D1) from the buffer 206 and operate on the image data (D1) in a manner known in the art to form a first image of the scene.

Further, in embodiments in which a wide-angle lens is employed, the processor 205 can optionally correct for any geometrical distortions of the image data by employing any suitable scheme known in the art. For example, the teachings of U.S. Pat. No. 6,833,843 entitled "Panoramic Imaging and Display System with Canonical Magnifier," and U.S. Pat. No. 7,750,936 entitled "Immersive Surveillance System Interface," which are herein incorporated by reference in their entirety, can be employed to correct the geometrical distortions of the wide-angle first image. Processing of data in embodiments that do not utilize a wide-angle lens can be done without requiring such corrections.

Furthermore, a wide angle lens can be used in combination with a curved Pellicle-type image splitter to direct the light received from the field of view to one or more image planes. In one implementation, images having resolutions of about 8,000 by 4,000 pixels can be obtained using two image planes (e.g., a pair of detectors) coupled to a curved Pellicle-type image splitter that connects to a wide angle lens.

Figure 3A:
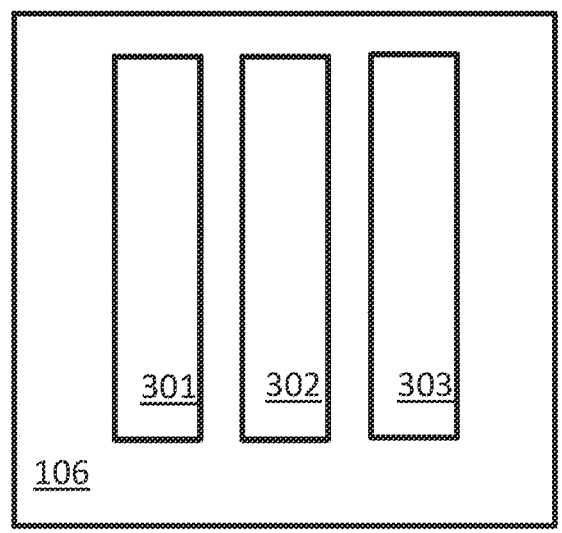
FIG. 3A is a schematic illustration of an example of an image plane that can be obtained using an image detecting array according to the embodiments disclosed herein.
Figure 3B:
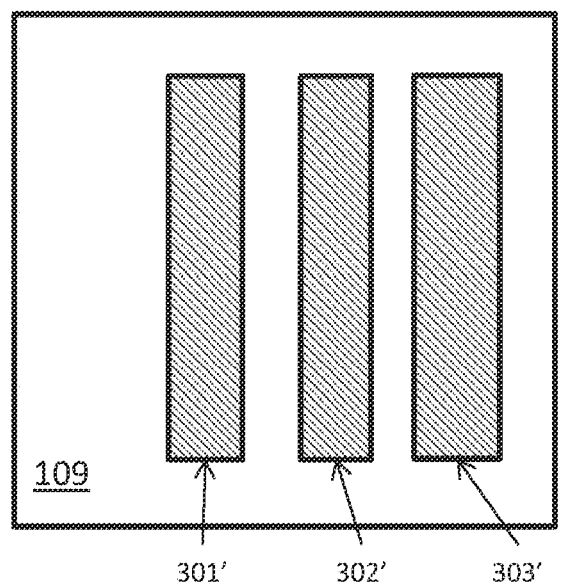
FIG. 3B is a schematic illustration of another example of an image plane that can be obtained using an image detecting array according to the embodiments disclosed herein.

FIGS. 3A-3B are schematic illustrations of image planes 106, 107 that can be obtained using one or more image detecting arrays according to the embodiments disclosed herein. Generally, the image detectors (e.g., first 107 and the second 108 image detectors) can be implemented in any suitable manner known in the art. For example, an image detector can be implemented as a plurality of image detecting elements that are fixedly coupled to a corresponding image plane. For example, as shown in FIG. 3A-3B, each image detector 107, 108 can be implemented as a plurality of image detecting elements 301, 302, 303 (for the first image detector 107), 301', 302', 303' (for the second image detector 108) that are fixedly coupled to image planes 106, 109 in which the image detectors 107, 108 are utilized.

Further, any suitable image detecting element known in the art can be used to form the image detectors (e.g., the first 107 and second 108 image detectors) described herein. For example, an image detecting element can include, without limitation, any of a Charge-Coupled Device (CCD), a Complementary Metal-Oxide Semiconductor (CMOS), a Thermal Imaging device, or any other imaging device known in the art and suitable for use with the embodiments disclosed herein.

The image detecting elements 301, 302, 303, 301', 302', 303' can be arranged in any suitable manner available in the art. For example, the image detecting elements 301, 302, 303, 301', 302', 303' can be arranged as an array and/or a matrix of image detecting elements that are configured to capture and detect the light directed to each image plane 106, 109. Arrangements of image detecting elements having various densities (i.e., the number of image detecting elements per unit area of the image plane) can also be used. Generally, the density of the arrangements of image detecting elements used can depend on various factors, such as the type of application in which the imaging system is used, the type of image detecting elements, etc.

The image detecting elements 301, 302, 303, 301', 302', 303' can be configured in any suitable manner known in the art. Further, the image detecting elements 301, 302, 303, 301', 302', 303' can be configured to communicate with the processor 205 and/or to transmit and/or receive image data or other information to/from the processor 205 using any suitable technique known in the art. Furthermore, the image detecting elements can be configured such that the image data acquired by the image detecting elements exhibits a predetermined total resolution. For example, in some implementations, the image detecting elements 301, 302, 303, 301', 302', 303' can be configured such that the image data acquired by those elements exhibits a total resolution greater than about 1 megapixel per square inch (e.g., in a range of about 1 megapixel to about 20 megapixels per square inch).

The linear density of the image detecting elements (e.g., the number of detecting elements per unit length) can be selected based on a variety of factors, such as a desired resolution for the second image, the physical constraints of the imaging system, cost, power consumption, etc. For example, in one embodiment, 6 image detecting elements (three per imaging plane) of approximately 15 mm×11 mm array of 2.4 μm pixels can be disposed along an extent of about 66 mm. This arrangement can result a resolution of approximately 120 Megapixels.

Figure 3C:
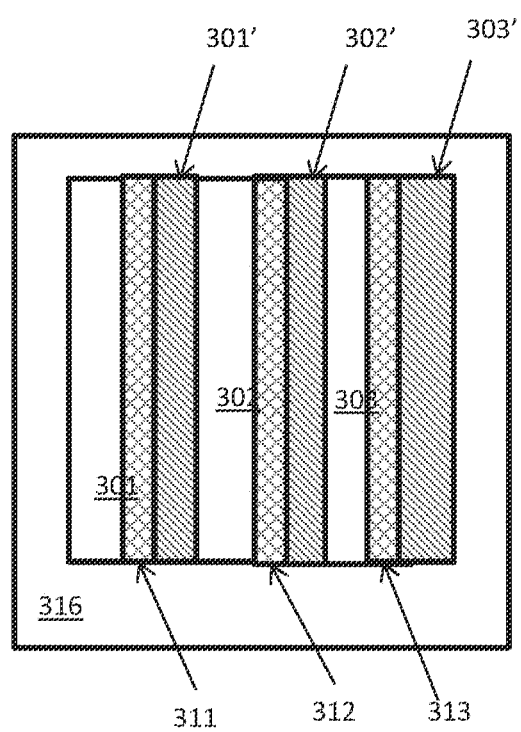
FIG. 3C is a schematic illustration of an example of a combined image plane formed using the image detecting arrays shown in FIGS. 3A and 3B.

The overlapping of image data acquired by the image detecting elements can allow for scaling of image data to significantly higher resolution than an image resolution that can be obtained using each individual image detector. As noted above with reference to FIG. 2, the processor 205 can arrange the image detecting elements to ensure that the data obtained by the image detecting elements corresponds to overlapping regions of the field of view. FIG. 3C is a schematic illustration of an example of a combined image plane 316 that can be formed using overlapping image data obtained from the detecting arrays shown in FIGS. 3A and 3B. The combined image plane 316 combines the image plane 106 formed using image detecting elements 301, 302, 303 with image plane 109 formed using image detecting elements 301', 302', 303'. As shown, once digitally combined, the image data obtained by the image detecting elements 301, 302, 303, utilized to form the first image plane 106, can overlap with the image data obtained using image detecting elements 301', 302', 303', utilized to form the second image plane 109. These overlapping regions 311, 312, 313 can provide additional information regarding the field of view. For example, the overlapping regions 311, 312, 313 can be used to obtain images having higher resolution than an image that can be obtained individually from the image detecting elements 301, 302, 303 in the first image plane 106 and/or an image that can be obtained individually from the image detecting elements 301', 302', 303' in the first image plane 109. Further, in some embodiments, the overlapping regions 311, 312, 313 can be used to obtain additional information (e.g., additional, more focused images) regarding the regions of field of view corresponding to the overlapping regions 311, 312, 313.

Figure 4A:
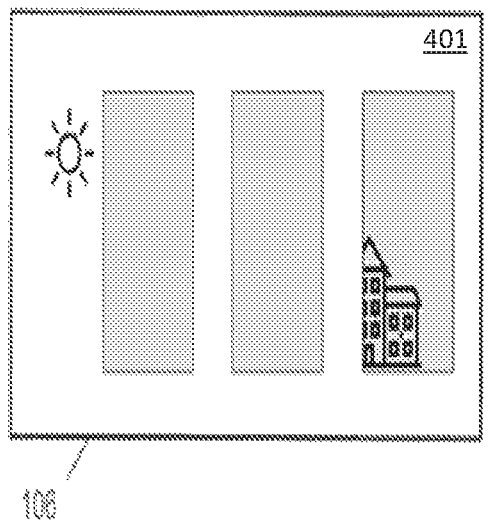
FIG. 4A is a schematic illustration of an image that can be obtained using the embodiments disclosed herein.
Figure 4B:
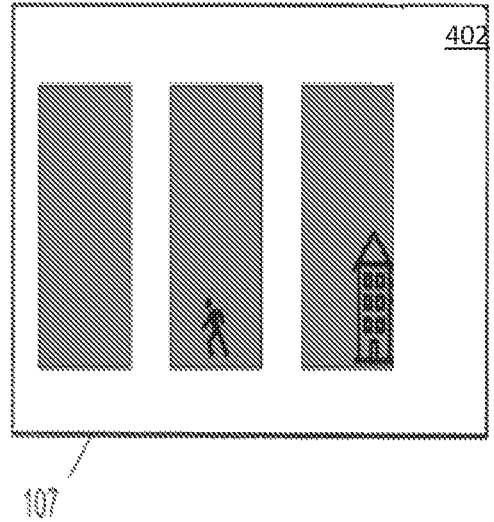
FIG. 4B is a schematic illustration of another image that can be obtained using the embodiments disclosed herein.
Figure 4C:
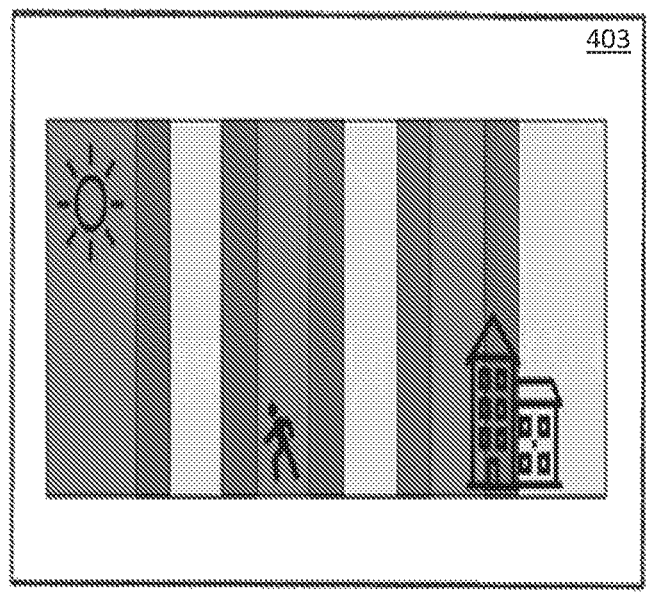
FIG. 4C is a schematic illustration of an image that can be obtained from combining the images shown in FIG. 4A and FIG. 4B.

FIG. 4A is a schematic illustration of a first image 401 that can be obtained using the embodiments disclosed herein. FIG. 4B is a schematic illustration of a second image 402 that can be obtained using the embodiments disclosed herein. FIG. 4C is a schematic illustration of an image 403 that can be obtained from combining (e.g., digitally) the first 401 and second 402 images shown in FIG. 4A and FIG. 4B. Specifically, FIG. 4A illustrates an image 401 containing the sun and part of a house, obtained from an overall field of view in a first image plane 106. FIG. 4B shows another image 402 containing a person walking and the complimentary portion of the house shown in FIG. 4A. The image 402 shown in FIG. 4B is obtained from the overall field of view in a second image plane 107. The two images 401, 402 from the first image plane 106 and the second image plane 107 can be combined to create a combined image 403 representing the entire field of view. For example, the processor 205 (FIG. 2) can combine the first image 401 and second image 402 to yield the image 403 of the entire field of view. The processor 205 can also determine range information for the overlapping areas. For example, in the example shown in FIGS. 4A-4C, the processor can determine the range elements such as the house, the person, and the sun are imaged, as these regions move into the overlapping regions. The processor can utilize any appropriate image recognition software to detect motions and overlapping regions.

The complementary and/or overlapping image planes disclosed herein provide an economically feasible manner (as compared to the presently available technology) in which large monolithic sensor/image detecting devices can be constructed. Alternatively or additionally, the complementary and/or overlapping image planes disclosed herein can be used to construct a mosaic of contiguous images. For example, in some implementations, an effective resolution of at least about 10 megapixels per square inch, and preferably 1000 megapixels per square inch, can be obtained. The term "effective resolution," as used herein, refers to a resolution that an equivalent monolithic 2-dimensional sensor would have. As an example, a sensor having 20,000 by 20,000 pixels can have an effective resolution of 400 megapixels.

Furthermore, in some implementations, the processor 205 can analyze the first image 401 to detect one or more objects of interest. Additionally or alternatively, the processor 205 can be configured to detect changes in one or more objects of interest in the field of view. For example, the processor 205 can be configured to detect changes in the location (e.g., motion or movement) of an object of interest in the field of view.

The processor 205 can utilize any suitable image recognition algorithm and/or method known in the art to detect the objects disposed in the field of view. For example, when the imaging system is utilized in surveillance or autonomous driving applications, the processor 205 can be configured (e.g., via loading appropriate software) to detect human subjects, vehicles, or any other object of interest in the field of view. Any suitable image recognition algorithms can be employed. For example, image recognition techniques such as those disclosed in U.S. Pat. No. 6,301,396 entitled "Nonfeedback-based Machine Vision Methods for Determining a Calibration Relationship Between a Camera and a Moveable Object," and U.S. Pat. No. 5,974,169 entitled "Machine Vision Methods for Determining Characteristics of an Object Using Boundary Points and Bounding Regions," the entire teachings of which are incorporated by reference in their entirety, can be used to detect and track objects disposed in the field of view.

Other available and suitable image processing techniques can also be employed to detect the motion of an object within a field of view. For example, successive image frames can be compared with one another to identify one or more objects, if any, that have moved within the field of view. For example, the teachings of U.S. Pat. No. 6,734,911 entitled "Tracking Camera Using a Lens that Generates Both Wide-Angle and Narrow-Angle Views," which are herein incorporated by reference in their entirety, can be employed to track moving objects within a field of view. The object tracking algorithm can, for example, first determine movement by differencing a series of sequential images and determine edge boundaries for moving objects, a process referred to as segmentation in the art. From these boundaries, motion vectors can be estimated for each object. To improve accuracy for the object size and velocity estimates, a predictive Kalman-type filter can be utilized to calculate best estimate probabilistic predictions for objects being tracked. Further, in some embodiments, successive images can be obtained according to a predetermined pattern. For example, when used for autonomous driving, successive frames can be subtracted to identify the sky, the road, lane boundaries and vehicles moving within each lane. Vehicles and people (e.g., on the sidewalk) can fit pre-determined patterns of movements.

Figure 5A:
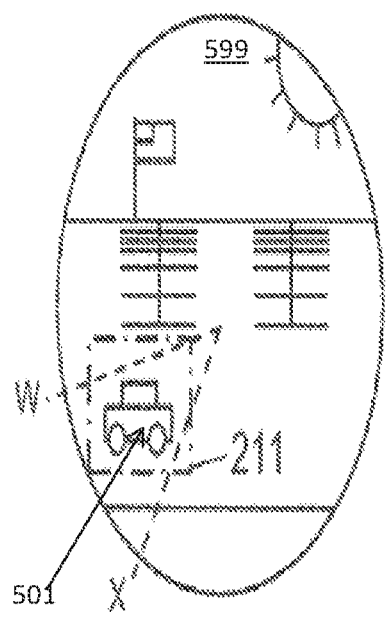
FIGS. 5A-5B are schematic illustrations of an image of a moving object that can be obtained using the embodiments disclosed herein.
Figure 5B:
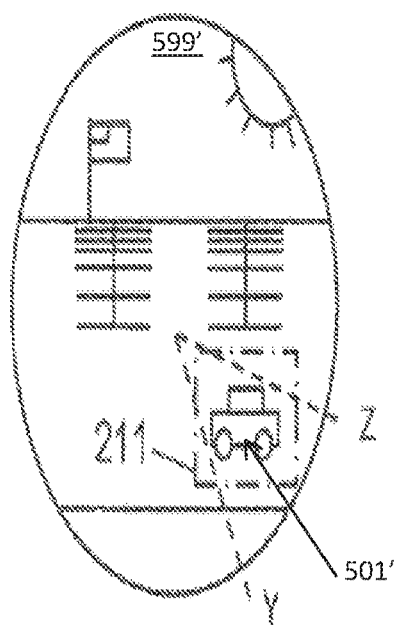

Furthermore, and as noted above, in some implementations the processor 205 can be configured to track one or more objects that are moving within the field of view. FIGS. 5A and 5B schematically depict a vehicle 501, 501' within a field of view 599, 599' (e.g., a parking lot) within corresponding image planes (spanned by X-W lines in FIG. 5A and Y-Z lines in FIG. 5B). The processor 205 (FIG. 2) can analyze the first image 599 (e.g., a wide-angle image of the parking lot) to detect the moving vehicle 501. Similarly, the processor 205 can analyze the second image 599' to detect the moving vehicle 501' in its new location. As noted above, the processor 205 can utilize any suitable image recognition software known in the art to detect the moving vehicle 501. Further, in obtaining the second image 599', the processor 205 can utilize information obtained from the first image 599 to determine arrangement of the image detecting elements (e.g., whether overlapping image detecting elements should be used). Any reasonable and/or suitable arrangement of image detecting elements can be used. Further, the image detecting elements can be arranged to acquire overlapping image data from different portions of the field of view.

For example, a plurality of image detecting elements arranged horizontally can be used to acquire image data that overlap in the horizontal direction. This can be useful for surveillance, where it may be desirable to provide digital panning with high resolution. In some embodiments, three planes, each having a 2-D array of image detecting elements can be used to provide continuous coverage of a larger 2-D image. This can allow digital pan and tilt with high resolution. Additionally or alternatively, in some embodiments, one image plane can contain additional optics, such as a focusing lens that allows a larger field of view to be condensed e.g., onto a single image detecting element. This can allow different image planes to provide different image resolutions. For example, one image plane can have a single image detecting element that is configured to provide a continuous lower resolution image. Such image detecting elements can be useful when a user is viewing the field of view in a zoomed out manner.

Similarly, an image plane can utilize an image detecting element that detects radiation in a different portion of the electromagnetic spectrum, such as thermal imaging data. By way of example, such a detecting element can allows for lower resolution imaging in such spectra. By way of example, in some embodiments, image detecting elements associated with one image plane can be infrared detecting elements that are configured to detect infrared radiation and the image detecting elements associated with another image plane can be configured to detect visible radiation (e.g., wavelengths in a range of 400 nm (nanometer) to 700 nm. In some embodiments, a polarizing beam splitter or filter can be used to provide different polarization or different subsets of detected light to the different image planes.

Further, as noted above, in addition to obtaining images of overlapping regions in overlapping image planes, embodiments disclosed herein can be used to obtain complementary images of one or more portions of the field of view. Once obtained, these complementary images can be combined to provide enhanced information regarding the field of view. For example, in some embodiments, the image data obtained via detecting elements associated with one image plane can have no overlap with the image data obtained via detecting elements associated with another image plane. Therefore, upon digitally stitching the two image data, an image of the field of view is obtained.

Figure 6:
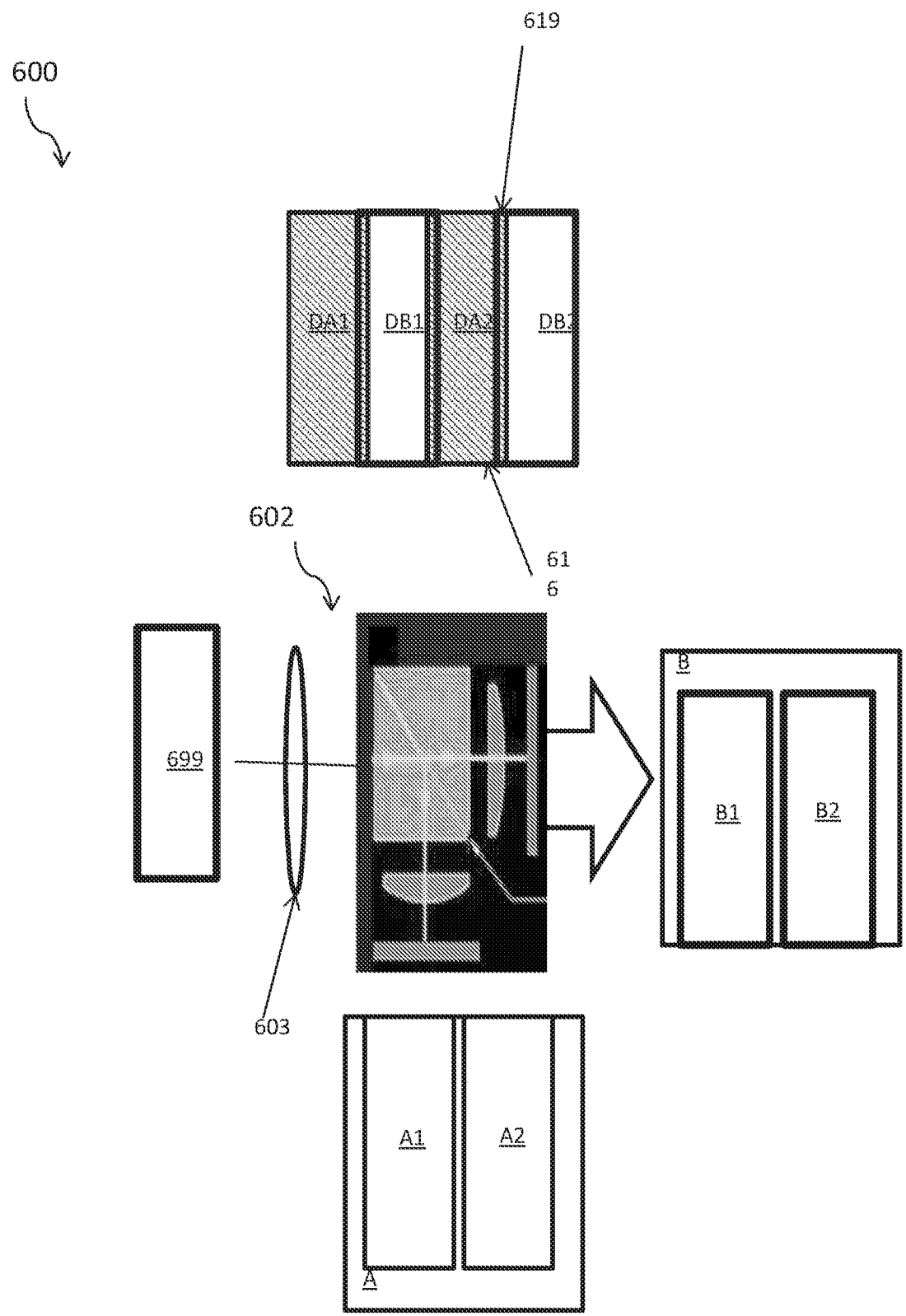
FIG. 6 is a schematic illustration of an example of a combined image plane formed using image detecting arrays according to some embodiments disclosed herein.

FIG. 6 illustrates a combined image plane 616 formed using complementary and overlapping image arrays arranged according to some embodiments disclosed herein. The imaging system 600 shown in FIG. 6 can include an optical system 602 that collects the light directed from a field of view 699. The optical system 602 can include one or more optical elements for receiving and directing the light received from the field of view 699. For example, in the illustrative embodiment shown in FIG. 6, the optical system 602 includes a converging lens 603 for received and directing the light forwarded from the field of view 699.

The imaging system 600 can further include additional optical elements for directing the light forwarded by the optical system 602. As described above with reference to FIGS. 1A-1B, generally, any suitable optical element known in the art can be used. For example, as noted above with reference to FIG. 1A, the converging lens 603 and any other optical element utilized in the imaging system 600 can be coupled to a beam splitter 605 and configured to direct the light collected by the optical system 602 onto a beam splitter 605. The converging lens 103 and the diverging lens 104 can collectively collimate the light received from the field of view and direct the collimated light to the beam splitter 105.

At least one portion of the light incident on the beam splitter 605 can be reflected by the beam splitter 605 to one or more complementary image detectors A1, A2. The complementary image detectors A1, A2 can be included in an image plane A. Other portions of the incident light can be passed through the beam splitter 605 to other complementary image detectors B1, B2, which are disposed in an image plane B. Generally, any suitable beam splitter known in the art can be used to direct the one or more portions of the light incident on the beam splitter onto the image detectors. For example, in the implementation shown in FIG. 6, a curved pellicle image splitter is used to shape the image and forward one or more portions of the incident light onto the image detectors A1, A2, B1, B2. In some other embodiments, a flat pellicle image splitter can be used.

As noted, each image plane A, B can include one or more image detectors (e.g., detectors A1, A2, B1, B2) and image detecting elements (e.g., image detecting elements 301, 302, 303, shown in FIG. 3A). The image detecting elements can be arranged in any suitable manner available in the art. For example, the image detecting elements can be arranged as an array and/or a matrix of image detecting elements that are configured to capture and detect the light directed to each image plane A, B.

The image detectors A1, A2, B1, B2 can be complementary image detectors that are configured such that the data obtained using these detectors, once combined, can be processed to form an image 616 of at least a portion of a region of interest in the field of view 299. For example, in the example shown in FIG. 6, the imaging system 600 is being used to image the region of interest using four complementary image detectors A1, A2, B1, B2. Once, the image data (DA1, Db1, DA2, DB2) acquired using these image detectors is combined, an image 616 of an entire region of interest can be obtained. The four complementary image detectors A1, A2, B1, B2 can detect light emitted by overlapping regions 619 of the field of view and generate image data DA1, DA2, DB1, DB2 from portions of the field of view 699 that at least overlap in one or more regions. These overlapping regions can be used to match the complementary image data DA1, DA2, DB1, DB2 during the combination process and/or to generate more detailed images (e.g., images having higher resolution) from the regions of field of view corresponding to the overlapping region.

Embodiments of the present invention can create images of a field of view having high resolution. For example, in one embodiment, by combining images associated with several individual image planes, images having a resolution as high as 15,000 by 54,400 pixels can be obtained using four image detectors.

Figure 7:
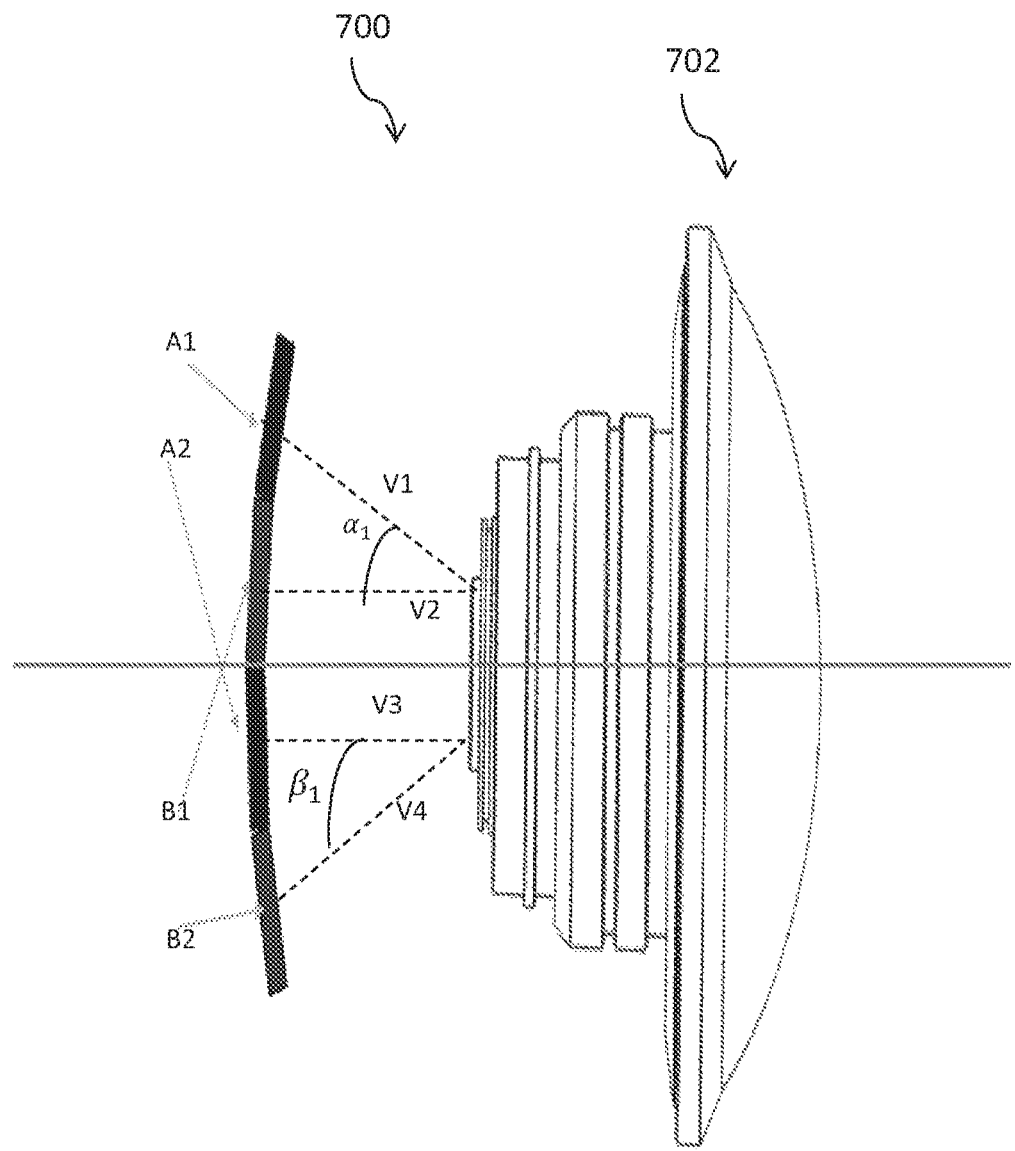
FIG. 7 is a schematic illustration of an example imaging system according to some embodiments disclosed herein.

Further, image detectors having various geometries can be used to obtain images having increased resolution. Generally, image detectors having any suitable shape known in the art can be used. For example, image detectors having a curved geometry can be used. FIG. 7 is a schematic illustration of an example imaging system that utilizes a combined image plane having a curved geometry. As shown in FIG. 7, the imaging system 700 can include an optical system 702 that is coupled with one or more image detectors A1, A2, B1, B2. Each image detector A1, A2, B1, B2 can include one or more image detectors (e.g., detectors 107, 109, shown in FIG. 1A) and image detecting elements (e.g., image detecting elements 301, 302, 303, shown in FIG. 3A). The image detectors A1, A2, B1, B2 can be arranged such that once combined they form a curved structure. As noted above, the image detectors A1, A2, B1, B2 can include complementary and/or overlapping regions.

As shown in FIG. 7, the image detectors A1, A1 are tilted relative to one another. Similarly, the image detectors B1, B2 are tilted relative to one another. In particular, the vectors V1, V2 perpendicular to the image planes A1, A2 form an angle $\alpha_1$ relative to one another, and vectors V3 and V4 that are orthogonal to the image vectors B1, B2 form an angle $\beta_1$ relative to one another. In some embodiments, the angles $\alpha_1$ and $\beta_1$ can be the same. In other embodiments, the angles $\alpha_1$ and $\beta_1$ can be different.

Embodiments disclosed herein can be used in various imaging applications. For example, in one embodiment (e.g., in security applications), the image data acquired by three image detectors in three individual, corresponding, image planes can be combined to construct a composite image having a resolution of about 15,000 by 5,500 pixels. An image splitter, such as a Pellicle-type image splitter, can be used to split the light from the field of view without causing any distortion in the resulting image. Although the use of a Pellicle-type image splitter is discussed herein, one skilled in the art should appreciate that any suitable optical element and/or image splitter can be used with the embodiments disclosed herein, for example prism-based optics.

Figure 8:
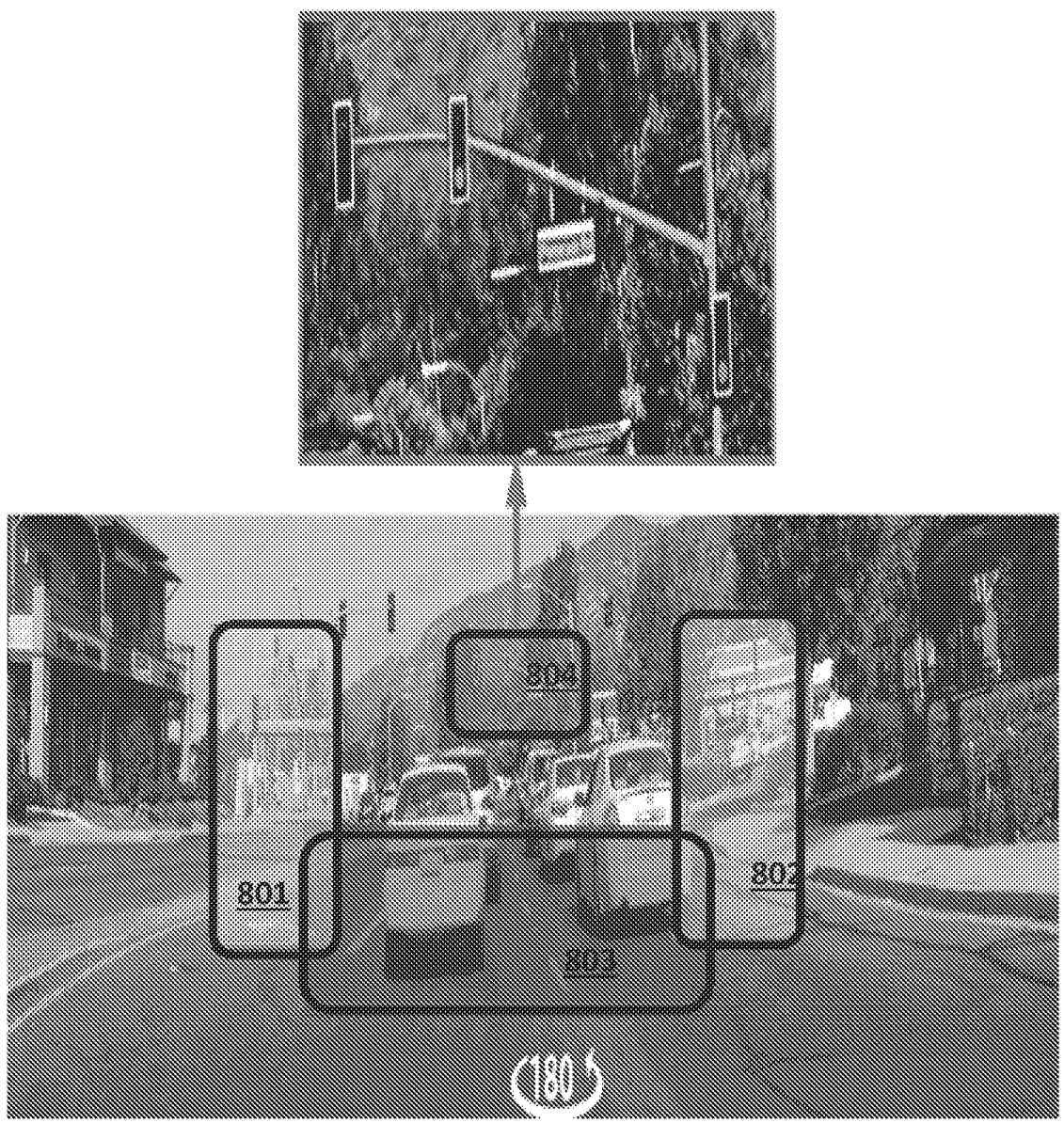
FIG. 8 is an illustrative example of image planes that can be used in operation of self-driving automobiles according to the embodiments disclosed herein.

Embodiments disclosed herein can also be used in autonomous operation of motor vehicles (e.g., self-driving cars). Specifically, image sensors arranged according to the embodiments disclosed herein can be coupled to two or more image planes to obtain images having high resolution, images with increased/reduced pixel size, images that capture the speed of moving vehicles, etc. FIG. 8 is an illustrative example of the various image planes that can be utilized in operating a self-driving automobile/car according to embodiments disclosed herein. In the example shown in FIG. 8, image plane 803 can use one or more optical detecting elements (sensors) optimized for objects on the road, such as detecting pot holes, etc. Image plane 804 can utilize one or more optical detecting elements (sensors) having a higher resolution. Such optical detecting elements can detect elements, such as street signs and traffic lights more accurately. Further, such optical detecting elements can be configured to detect street signs and traffic lights that may be positioned at a distance from the self-driving car. Further, image planes 801, 802 can include optical detecting elements optimized for reading roadside signs.

Other features and aspects of the various embodiments can also suitably be combined and/or modified consistent with the present disclosure. The disclosure herein should not, therefore, be limited to any particular disclosed embodiment, and should be given full scope of the appended claims.

What is claimed is:

1. An imaging system, comprising:
an optical system configured to receive light from a field of view and direct the received light to a plurality of image planes;
a first plurality of image detectors optically coupled to a first image plane, the first plurality of image detectors being configured to detect at least a first portion of the light directed by the optical system to the first image plane and generate first image data corresponding to at least a first portion of the field of view;
a second plurality of image detectors optically coupled to at least another image plane, the second plurality of image detectors being configured to detect at least a second portion of the light directed by the optical system to the at least another image plane and generate second image data that include data corresponding to a second portion of the field of view that is spatially complementary to the first portion of the field of view;
a processor in communication with the first and the second plurality of image detectors to combine said first image data and said second image data to generate a composite image of the field of view; and
a user interface in communication with the processor and configured to receive input instructions from a user of the imaging system,
wherein:
the first and the second plurality of image detectors are positioned relative to one another such that the combined image includes dead zone image information corresponding to at least one dead zone;
the dead zone image information is absent from at least one of said first and said second image data; and
the user interface is configured to receive instructions requesting additional information regarding a specific portion of the first image, and the processor, in response to the instructions, is configured to control the second plurality of image detectors to acquire image data of at least a portion of the field of view corresponding to the specific portion of the image.

2. The imaging system of claim 1, wherein the optical system is configured to split the light received from the field of view into two or more portions and direct each of said portions to a different one of said image planes.

3. The imaging system of claim 2, wherein the optical system comprises an image splitter configured to split the light received from the field of view.

4. The imaging system of claim 3, wherein said image splitter is at least one of a prism-type image splitter, a flat Pellicle-type image splitter, or a curved Pellicle-type image splitter.

5. The imaging system of claim 1, further comprising a processor in communication with the first and second plurality of image detectors and configured to receive the first and the second image data and generate a first image of the field of view corresponding to the first image data and a second image of the field of view corresponding to the second image data.

6. The imaging system of claim 5, wherein the processor is configured to combine the first and second image data to generate combined image data of the field of view.

7. The imaging system of claim 6, wherein the processor is configured to generate said combined image of the field of view using the combined image data.

8. The imaging system of claim 5, wherein the processor is configured to combine said first and second images of the field of view to generate a said combined image of the field of view such that said combined image has at least one of 1) a higher resolution or 2) additional depth information relative to the first image or the second image.

9. The imaging system of claim 5, wherein the first plurality of image detectors is further configured to acquire a video image of the field of view and wherein the processor is configured to analyze said video image to identify one or more moving objects within the field of view.

10. The imaging system of claim 9, wherein the processor is configured to control the second plurality of image detectors to acquire image data of at least a portion of the field of view having at least one of the identified one or more moving objects included therein.

11. The imaging system of claim 8, further comprising at least one display element, the display element being in communication with the processor and configured to display at least one of the first, the second, and the combined image.

12. The imaging system of claim 1, wherein at least one of the first or the second plurality of image detectors comprises a substantially curved geometry.

* * * * *